(Model.)

C. R. THOMPSON.
HIVE CART.

No. 293,115. Patented Feb. 5, 1884.

WITNESSES:
John G. Deemer
C. Sedgwick

INVENTOR:
C. R. Thompson
BY Munn & Co.
ATTORNEYS.

UNITED STATES PATENT OFFICE.

CHARLES R. THOMPSON, OF FORT OMAHA, NEBRASKA.

HIVE-CART.

SPECIFICATION forming part of Letters Patent No. 293,115, dated February 5, 1884.

Application filed June 25, 1883. (Model.)

*To all whom it may concern:*

Be it known that I, CHARLES R. THOMPSON, of Fort Omaha, in the county of Douglas and State of Nebraska, have invented a new and Improved Hive-Cart, of which the following is a full, clear, and exact description.

This invention consists of a hand-cart adapted for shifting bee-hives from place to place.

Reference is to be had to the accompanying drawings, forming part of this specification, in which similar letters of reference indicate corresponding parts in both the figures.

Figure 1:
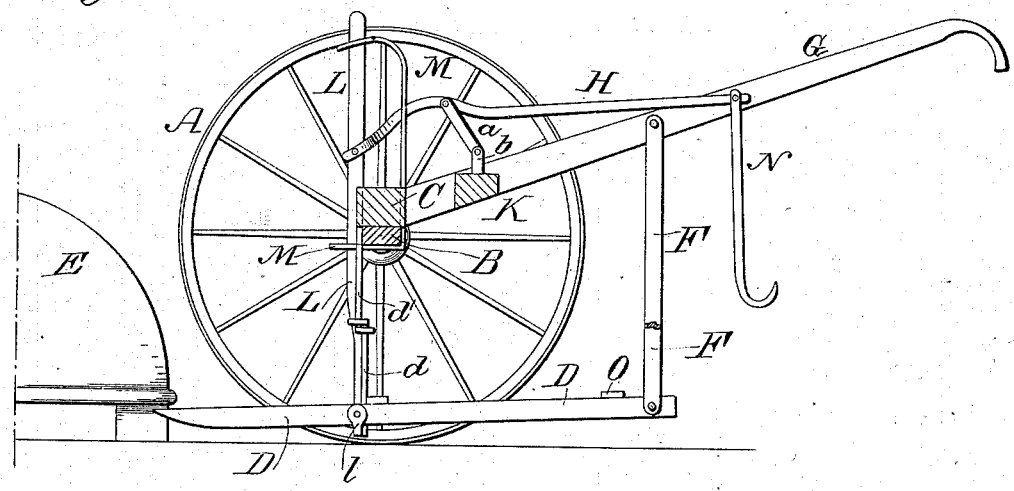
Figure 2:
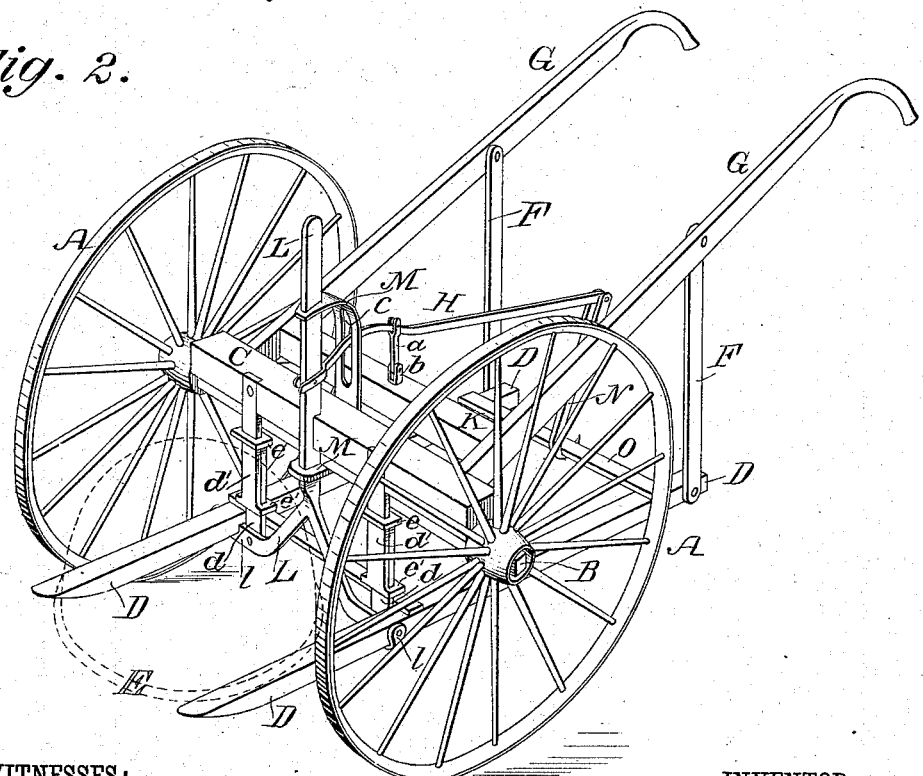

Figure 1 is a sectional elevation of my hive-cart, showing the method of approaching and lifting the bee-hive; and Fig. 2 is a perspective view of the cart having the bee-hive loaded thereon, the hive being shown in dotted lines.

The wheels A A and axle B are like the wheels and axle of an ordinary two-wheeled hand-cart. In this instance I have shown placed upon the axle B the bar C; but this obviously might be omitted, since the parts attached thereto might be attached directly to the axle, the axle being suitably constructed for that purpose.

D D are the lifting bars for lifting and carrying the bee-hive E. These lifting-bars are suspended under the axle B, parallel with each other, and project in front and rear of the axle, and are pivoted at their rear ends in the hangers F F, depending from the handles G G, so that their forward ends may be lowered by the lever H (which is suitably fulcrumed and connected, by suitable means, at its forward end to the bars) for permitting the bars to be passed under the hive and then raised by the said lever for lifting the hive up off from its supports, thus loading the hive upon the cart, as illustrated in Fig. 2.

Various means might be used for fulcruming the lever H and connecting its forward end to the bars D D; but I prefer to fulcrum the lever by means of link-and-eye plate $a$ $b$ on the cross-piece K, held between the handles G G, and to employ the T-iron L for connecting its forward end with the bars. This T-iron is guided above and below the axle in the angle-plate M, attached to the axle B and bar C, and this plate is slotted at $c$, through which the forward end of the lever H passes, so that it serves also as a guide to the up-and-down movement of the lever. At its rear end the lever H is provided with the hook N, by which, when the rear end of the lever is depressed, it may be locked to cross-piece O for holding the forward ends of the bars D D elevated for carrying the hive clear of the ground or floor of the bee-house; and for bracing the lower end of the T-iron L, and also the carrying-bars D D, against any swaying movement I employ the two irons $d$ $d$, attached to the members $l$ $l$ of the T-iron, and the duplicate irons $d'$ $d'$, attached to the bar C or axle B, these irons being yoked together by the collars $e$ $e$ and $e'$ $e'$ in such manner that the irons $d$ $d$ may slide upon irons $d'$ $d'$, but are held by irons $d'$ $d'$ from any material lateral movement.

The handles G G are attached rigidly to the axle B or bar C, so that they serve as levers for lifting the bee-hive upon the carrying-bars D D, thus enabling a very heavy hive to be lifted and moved with the outlay of very little strength. Besides the advantage of easy handling of the hive, the same may be lifted and moved gently without disturbing the bees, and the work which now requires two persons to perform may be quickly and easily done by one, with the use of the cart; and by enlarging the dimensions of the cart it may be used for carrying brick and mortar in boxes or suitable receptacles to an elevator to be lifted to the top of a wall or building; and by using several boxes or platforms two men can handle material very fast, the boxes or platforms being filled and lifted by the bars D D of the cart and carried to and placed upon the elevator without lifting the cart to the top of the building or wall, as is the case with wheelbarrows when used for such purposes.

I do not abandon or dedicate to the public any patentable feature set forth herein and not hereinafter claimed, but reserve the right to claim the same either in a reissue of any patent that may be granted upon this application or in other applications for Letters Patent that I may make.

Having thus described my invention, what I claim as new, and desire to secure by Letters Patent, is—

1. In a hive-cart, the lever H, having hook N, in combination with the bars D D, the hook being adapted to hold the lever depressed and the forward ends of the bars elevated, substantially as described.

2. The hive-cart herein shown and described, consisting of the wheels A A, axle B, and handles G G, in combination with bars D D, lever H, T-iron L, and hook N, the bars D D being pivoted in hangers F F, and the hook being adapted to catch under cross-piece O, substantially as and for the purposes set forth.

3. In a hive-cart, the lever H, fulcrumed by means of the link $a$ upon the cross-piece K, substantially as shown and described.

4. The combination, with lever H and T-iron L, of the guide-plate M, arranged substantially as and for the purposes set forth.

5. The T-iron L, provided with the irons $d$ $d$, in combination with the irons $d'$ $d'$, attached to the axle or cross-bar C and yoked together, substantially as and for the purposes set forth.

CHAS. R. THOMPSON.

Witnesses:
    CHAS. W. EDGARTON,
    J. H. THOMPSON.